Nov. 21, 1933.  R. H. NICHOLSON  1,936,095
SEPARABLE FASTENER

Filed Sept. 1, 1928

INVENTOR.
Robert H. Nicholson
BY
ATTORNEY.

Patented Nov. 21, 1933

1,936,095

UNITED STATES PATENT OFFICE

1,936,095

SEPARABLE FASTENER

Robert H. Nicholson, Meadville, Pa., assignor to Hookless Fastener Company, Meadville, Pa., a corporation of Pennsylvania Application September 1, 1928. Serial No. 303,455

17 Claims. (Cl. 24—205)

This invention relates to separable fasteners of the type in which adjoining rows of flexibly supported fastener elements are progressively interlocked and released by means of a slider mounted for movement back and forth along the rows of fastener elements.

The present invention has for an object to provide a locking device in connection with the slider of a separable fastener which is operated by the slider pull so that by positioning the slider pull with respect to the slider, the slider may be held in any desired position from which it will not move, thus preventing opening or closing of the fastener until the locking device is released.

A further object is to provide a brake type locking device which is formed for frictional engagement with the fastener element, which will not distort the fastener elements from their proper positions and which will not mar or otherwise damage the fastener elements or subject them to objectionable wear.

A further object is to provide a locking device which is extremely simple in construction, which requires but little modification of the slider construction to accommodate it and which may be embodied in a slider without materially increasing the cost of manufacture.

With the above and other objects in view, the invention may be said to comprise the separable fastener as illustrated in the accompanying drawing hereinafter described and particularly set forth in the appended claims, together with such variations and modifications thereof as will be apparent to one skilled in the art to which the invention appertains.

Reference should be had to the accompanying drawing forming a part of this specification in which.

Figure 1:
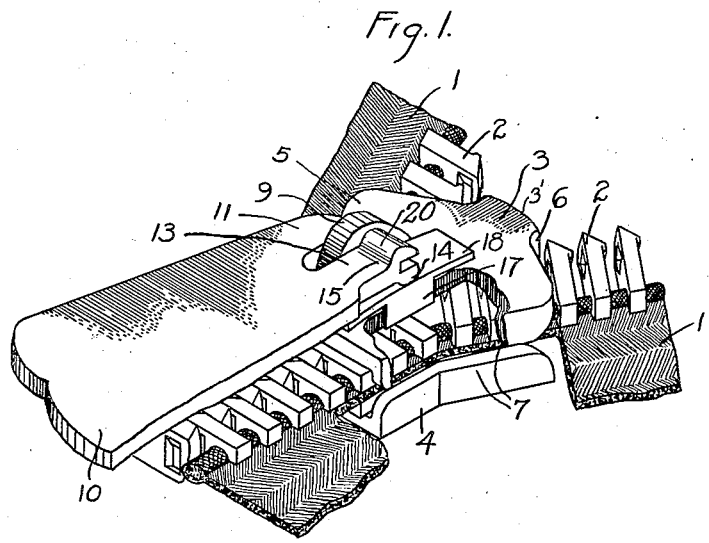
Figure 1 is a fragmentary perspective view partially in section, showing a portion of the separable fastener, together with the slider and locking device embodying the invention.
Figure 2:
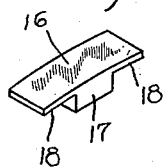
Fig. 2 is a perspective view of the locking member detached.
Figure 3:
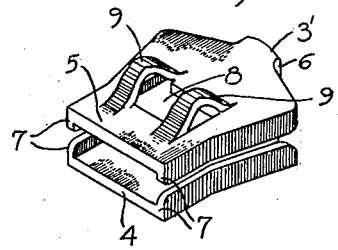
Fig. 3 is a perspective view of the slider with the pull member and locking member omitted.

Referring to the accompanying drawing, separable fasteners of the type employed for continuously securing flexible flaps together along their adjoining edge portions are shown in Fig. 1. To the edges of these flaps indicated by the reference numeral 1 in Fig. 1 are attached at closely spaced points fastener elements 2, which are formed for interlocking engagement and which are progressively guided into and out of interlocking engagement by means of a slider 3 which is mounted for sliding movement on the fastener elements 2 and which has an inner wing 4 overlying the inner sides of the fastener elements and an outer wing 5 overlying the outer sides of the fastener elements. The wings 4 and 5 are disposed in parallel relation and are connected at one end by an integral web 3', the wings being provided with opposed guide flanges 7, which serve to guide the fastener elements 2 past the web 3' and into or out of interlocking engagement with each other, depending upon the direction of movement of the slider.

The separable fastener so far described is old and well known, the present invention consisting of a locking device carried by the slider by which the slider may be held against movement in any desired position along the length of the fastener.

Figure 4:
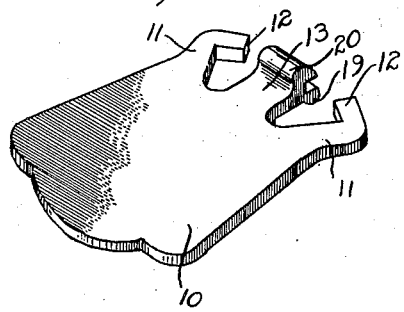
Fig. 4 is a perspective view of the pull member before it is attached to the slider.

The flanged wings and connecting web of the slider are preferably formed from strip stock between suitable dies and the wings are subsequently bent into opposed relation about the narrow connecting web 3'. The wing 5 of the slider is provided with a centrally disposed opening 8 and with integral hinge loops 9 struck up from the body thereof on opposite sides of the opening. A pull member 10 is pivotally connected at one end in the loops 9 of the slider, the pull member 10 being preferably in the form of a flat plate having integral arms 11 at one end which overlie the outer sides of the loops 9, the arms 11 being provided with integral hinge lugs 12 which project into the loops 9 to provide a pivotal connection between the slider and pull member. The pull member is first formed as shown in Fig. 4 with the arms 11 extending outwardly at an angle from the body of the pull member so as to space the lugs 12 sufficiently to permit the loops 9 to enter between them. The arms 11 are then pressed toward each other to force the lugs 12 into the loops 9 and permanently attach the pull member to the slider. The pull member also has a central projection 13 which extends between the hinge loops 9 of the slider and the pivot lugs 12 may be of a length such that they are brought into engagement with the projection 13 when the arms 11 are pressed inwardly to force the lugs 12 through the loops 9.

The opening 8 is provided in the slider to accommodate a locking member 16 designed to engage the fastener elements 2 and hold the slider against movement along the fastener. The locking member 16 is provided with a projection 17 which substantially fits in the opening 8 and with flat arms 18 on opposite sides of the projection which engage with the outer face of the slider, on opposite sides of the opening 8.

The locking member is formed of resilient metal and the arms 18 are slightly bowed so that they engage the slider at their outer ends only and normally support the projection 17 in a position out of engagement with the fastener elements 2 so that the locking member does not interfere with the normal operation of the slider. The locking member 16 may be formed by rolling a wire of suitable gauge to form a strip with spaced projections and intermediate flat portions, and then severing the strip midway between the successive projections to form the locking members.

The central projection 13 of the pull member 10 is provided on the opposite faces thereof with cam shoulders 19 and 20 which are so formed that when the pull member is swung to a position in which it lies flat upon the face of the slider, one cam shoulder or the other will bear upon the center of the locking member 16 and press the same inwardly into engagement with the fastener elements 2 to lock the slider against movement. When the pull member is swung outwardly from either of its extreme positions, the pressure on the locking member 16 is released and the arms 18 by their resiliency shift the projection 17 out of engagement with the fastener elements so that the slider is free to move in either direction.

It should be noted that the projection 17 has a relatively wide flat face which engages the outer faces of the fastening elements and locks the slider against movement by its frictional engagement with the fastener elements, the locking member acting to press the fastener elements against the inner wing 4 of the slider without distorting them out of their normal positions. The width of the engaging face of the locking member is greater than the space between two adjacent fastener elements so that the locking member cannot enter the space between adjacent fastener elements and separate the same. The smooth engaging face of the projection 17 cannot mar or otherwise damage the fastener elements and since the locking member preferably does not engage the fastening elements during movements of the slider, there is no wear on the fastening elements due to the locking device.

It should also be noted that the locking device of the present invention consists of a single element in addition to the slider and pull member and that to accommodate the locking element, it is only necessary to form the wing of the slider to which the pull member is attached with an opening to receive the locking member beneath the inner end of the pull member and that the locking device may be embodied in a slider without materially increasing the cost of manufacture.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. In a separable fastener having coacting rows of spaced flexibly supported fastener elements formed for interlocking engagement, a slider for progressively locking and releasing the fastener elements, a locking member carried by the slider and having a flat face wider than the space between adjacent fastener elements and engageable with said fastened elements to hold the slider against movement, and a pull member attached to the slider and having a part engageable with the locking member to actuate the same.

2. In a separable fastener having coacting rows of spaced flexibly supported fastener elements formed for interlocking engagement, a slider for progressively locking and releasing the fastener elements, a yieldingly supported locking member mounted on the slider and normally held out of engagement with the fastener elements, said locking member having a flat face wider than the space between adjacent fastener elements and engageable with said fastener elements to hold the slider against movement and a pull member movably connected to the slider, said pull member having a cam portion engageable with the locking member to press the same into engagement with the fastener elements.

3. In a separable fastener having coacting rows of flexibly supported fastener elements formed for interlocking engagement, a slider for progressively locking and releasing the fastener elements, said slider having an opening therein, a locking element having a part extending through the opening and resilient arms bearing upon the outer face of the slider to normally hold the locking element out of contact with the fastener elements, and a pull member attached to the slider and having a part engageable with the locking member to press the same into engagement with the fastener elements.

4. In a separable fastener having coacting rows of flexible supported fastener elements formed for interlocking engagement, a slider for progressively locking and releasing the fastener elements, said slider having an opening therein, a locking element having a part extending through the opening and resilient arms bearing upon the outer face of the slider to normally hold the locking element out of contact with the fastener elements, and a pull member pivotally attached to the slider and having a cam portion engageable with the locking member to press the same into engagement with the fastener elements.

5. In a separable fastener having coacting rows of flexible supported fastener elements formed for interlocking engagement, a slider for progressively locking and releasing the fastener elements, said slider having an opening therein, a locking element having a part extending through the opening and resilient arms bearing upon the outer face of the slider to normally hold the locking element out of contact with the fastener elements, and a pull member pivotally attached to the slider, said pull member having cam portions engageable with the locking member when the pull member approaches either of its limits of pivotal movement with respect to the slider to press the locking member into engagement with the fastener elements.

6. In a separable fastener having coacting rows of flexibly supported fastener elements formed for interlocking engagement, a slider for progressively locking and releasing the fastener elements, said slider having opposed wings between which the fastener elements are guided, one of said wings having an opening and hinge lugs on opposite sides of the opening, a resilient member extending across the opening and having a part projecting into the opening, said member being normally held by its resiliency out of engagement with the fastener elements, and a pull member pivotally connected with the hinge lugs and having a part engageable with the resilient member to force the same inwardly into engagement with the fastener elements.

7. In a separable fastener having coacting rows of flexibly supported fastener elements formed for interlocking engagement, a slider for progressively locking and releasing the fastener elements, said slider having opposed wings between which the fastener elements are guided, one of said wings having an opening and hinge lugs on opposite sides of the opening, a resilient member extending across the opening and having a part projecting into the opening, said member being normally held by its resiliency out of engagement with the fastener elements, and a pull member pivotally connected with the hinge lugs and having a portion between said lugs engageable with the resilient member when the pull member is moved to a position in which it lies flat upon the fastener to press the resilient member into frictional engagement with the fastener elements.

8. In a separable fastener having coacting rows of flexibly supported fastener elements formed for interlocking engagement, a slider for progressively locking and releasing the fastener elements, said slider having opposed wings between which the fastener elements are guided, one of said wings having an opening and hinge lugs on opposite sides of the opening, a resilient member extending across the opening and having a part projecting into the opening, said member being normally held by its resiliency out of engagement with the fastener elements, and a pull member pivotally connected with the hinge lugs and having a projection extending between said hinge lugs, said projection having opposite side faces engageable with the resilient member to press the same into engagement with the fastener elements.

9. In a separable fastener having coacting rows of spaced flexibly supported fastener elements formed for interlocking engagement, a slider for progressively locking and releasing the fastener elements, a locking element carried by the slider and having a smooth flat face wider than the space between adjacent fastener elements and adapted to frictionally engage said fastener elements, and a pull member pivotally attached to the slider and having a part engageable with the locking element to press the same against the fastener elements.

10. In a device of the character described, a slider having spaced loops struck up from the body thereof, a locking member between said loops, and a pull member having a portion extending between the loops adapted to actuate said locking member and arms overlying the outer sides of the loops, said arms having integral pivot lugs extending into the loops.

11. A separable fastener slider comprising spaced wings, an opening in one wing, a locking member resting loosely in said opening, and a pull member pivoted to the wing adjacent said opening and having a portion adapted to depress said locking member.

12. In a separable fastener having coacting rows of fastener elements formed for interlocking engagement, a slider for progressively locking and releasing the fastener elements, an opening in said slider, a locking member resting loosely in said opening, and a pull member pivoted on said slider adjacent said opening and having a portion engageable with said locking member to depress same.

13. A separable fastener slider comprising spaced wings, an opening in one wing, a locking member resting loosely in said opening, and a pull member pivoted to the wing and having a portion adapted to depress said locking member.

14. In a separable fastener having coacting rows of fastener elements formed for interlocking engagement, a slider for progressively locking and releasing the fastener elements, an opening in said slider, a locking member resting loosely in said opening, and a pull member pivoted on said slider and having a portion engageable with said locking member to depress same.

15. A separable fastener slider comprising spaced wings, an opening in the intermediate portion of one wing, a locking member having an intermediate part thereof resting loosely in said opening and a pull member pivoted to the wing and having a portion adapted to depress said intermediate part.

16. A slider for fasteners of the kind having stringers carrying series of interengaging fastener elements, said slider having a part provided with an opening therein, retaining means comprising a shoe fitting loosely in said opening and adapted to engage the fastener elements for holding the slider in adjusted position, and a pull comprising a part cooperable with the retaining means, for moving the shoe into operative relation to the fastener elements.

17. In a separable fastener, a slider comprising spaced wings, a pull member for actuating the slider, and a pair of spaced loop members stamped from the metal of one of said wings to project therefrom, said pull member having a pair of spaced arms engaging one in each of said loop members whereby the pull member is pivotally attached to the slider, and means for locking said slider in position between said loop members.

ROBERT H. NICHOLSON.